(12) United States Patent
Billman

(10) Patent No.: US 8,718,710 B2
(45) Date of Patent: May 6, 2014

(54) METHOD FOR AUTOMATIC PROVISIONING OF A SIM CARD

(75) Inventor: Niklas Billman, Ronninge (SE)

(73) Assignee: Giesecke & Devrient GmbH, Munich (DE)

( * ) Notice: Subject to any disclaimer, the term of this patent is extended or adjusted under 35 U.S.C. 154(b) by 2 days.

(21) Appl. No.: 13/502,779

(22) PCT Filed: Nov. 23, 2010

(86) PCT No.: PCT/SE2010/051290
§ 371 (c)(1),
(2), (4) Date: Apr. 19, 2012

(87) PCT Pub. No.: WO2011/071438
PCT Pub. Date: Jun. 16, 2011

(65) Prior Publication Data
US 2012/0208597 A1 Aug. 16, 2012

(30) Foreign Application Priority Data
Dec. 9, 2009 (SE) ........................................ 0950947

(51) Int. Cl.
*H04B 1/38* (2006.01)
*H04M 1/00* (2006.01)

(52) U.S. Cl.
USPC ............................ 455/558; 455/411; 455/419

(58) Field of Classification Search
USPC ........... 455/558, 411, 419; 450/558, 411, 419
See application file for complete search history.

(56) References Cited

U.S. PATENT DOCUMENTS

| | | | |
|---|---|---|---|
| 2006/0129848 A1* | 6/2006 | Paksoy et al. | 713/193 |
| 2006/0183500 A1* | 8/2006 | Choi | 455/558 |
| 2007/0167161 A1* | 7/2007 | Cheng et al. | 455/435.1 |
| 2008/0260149 A1 | 10/2008 | Gehrmann | |
| 2010/0029247 A1* | 2/2010 | De Atley et al. | 455/411 |
| 2010/0275027 A1* | 10/2010 | Belrose et al. | 713/176 |
| 2010/0285834 A1* | 11/2010 | Hutchison, IV | 455/550.1 |
| 2011/0195751 A1* | 8/2011 | Atley et al. | 455/558 |
| 2012/0021805 A1* | 1/2012 | Hauck et al. | 455/558 |

FOREIGN PATENT DOCUMENTS

| | | |
|---|---|---|
| EP | 1 895 791 A1 | 3/2008 |
| WO | 2005/109947 A1 | 11/2005 |
| WO | 2009/029156 A1 | 3/2009 |

OTHER PUBLICATIONS

International Search Report, dated Mar. 15, 2011, from corresponding PCT application.

* cited by examiner

*Primary Examiner* — Qun Shen
(74) *Attorney, Agent, or Firm* — Workman Nydegger

(57) ABSTRACT

A method of automatic provisioning of a SIM card (2) when using the SIM card for the first time by an OTA (Over-The-Air) platform (1) and a mobile telephone (8) includes steps of equipping the SIM card (2) with an automated provisioning application (3) that becomes resident on the SIM card (2), activation data including IMSI and other data is being stored on the SIM card, the SIM card (1) is caused to send a provisioning request, when the SIM card is placed in a mobile telephone (8) for the first time and the telephone is switched on, to the OTA platform (1), a database (7) associated with the OTA platform (1) is updated with data including ICCID, IMSI and OTA keys, the OTA platform (1) retrieves MSISDN from the data sent to the OTA platform and in that the MSISDN is attached to the IMSI.

8 Claims, 1 Drawing Sheet

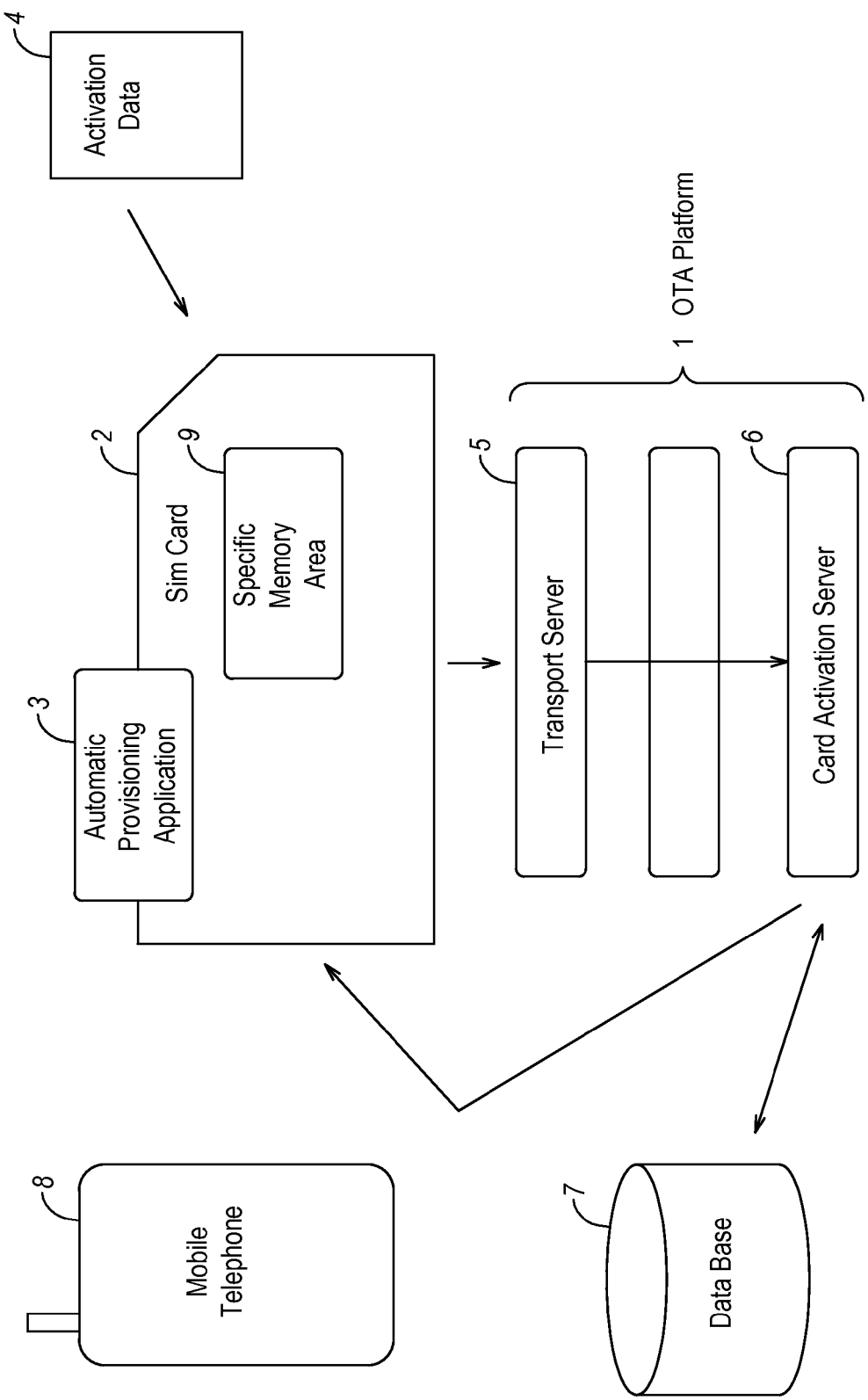

METHOD FOR AUTOMATIC PROVISIONING OF A SIM CARD

The present invention refers to a method for automatic provisioning of a SIM card by means of an OTA—application.

The term "provisioning" in the present application and in the claims means the process of preparing and equipping a network to allow it to provide services to its users.

When activating a SIM (Subscriber Identity Module) card, data files are conventionally sent from a SIM-Card vendor to a Mobile Network Operator (MNO) to populate an OTA (Over-The-Air) platform with OTA security information such as ICCID (Integrated Circuit Card ID), MSISDN (Mobile Station ISDN number), IMSI (International Mobile Subscriber Identity), and OTA keys. The security information is in an encrypted file which is sent electronically to the Mobile Network operator in order to activate the SIM card such that the mobile telephone can be used.

The traditional flow of SIM card procurement and delivery is as follows.

The ordering process defines a so called card profile that defines the layout of the file system on the card as well as other properties. The card profile is then implemented on the SIM cards. In addition to the profile related information, the SIM cards are programmed with card specific data.

The combined knowledge of profile and card specific data is expressed in data transport files, often called CPS (Card Personalization System) files.

In order to ensure proper operation of the OTA system, these CPS files are transferred to the MNO. The MNO imports these files into the OTA system in order to make the SIM card operational in the OTA platform and makes OTA communication with the SIM cards possible.

Said CPS files containing SIM-OTA (SIM Over-The-Air) security information are sometimes lost or never delivered to the OTA platform, resulting in that the OTA platform is not being capable of performing the requested operations. That means that when a SIM card is connected to the network, OTA operations will fail since the OTA platform will reject requests from the SIM card due to missing card information. This includes OTA operation for updating the SIM card and service access initiated by the user resulting in a mobile originated message to the OTA platform.

In some MNO's there are no other relation between the submitter of the SIMOTA security information file and the receiver than said CPS files.

The above described procedure also involves human and manual intervention which takes time and is costly.

The present invention simplifies this organizational procedure and limits the involvement of an MNO in the provisional procedure.

The present invention thus refers to a method of automatic provisioning of a SIM (Subscriber Identity Module) card when using the SIM card for the first time by means of an OTA (Over-The-Air) platform and a mobile telephone, and is characterized in, that equipping the SIM card with an automated provisioning application that becomes resident on the SIM card, in that activation data comprising IMSI (International Mobile Subscriber Identity) and other data is being stored on the SIM card, in that the SIM card is caused to send a provisioning request, controlled by said application, when the SIM card is placed in a mobile telephone for the first time and the telephone is switched on, to the OTA platform, in that a database associated with the OTA platform is updated with data including ICCID (Integrated Circuit Card ID), IMSI and OTA keys, which data has been transferred from the SIM card to the OTA platform, in that the OTA platform retrieves MSISDN (Mobile Station ISDN number) from the data sent to the OTA platform and in that the MSISDN is attached to said IMSI.

The present invention will be described in more detail below, partially with reference to drawings showing an exemplary embodiment of the invention, where FIG. 1 shows a block diagram illustrating the present invention.

In FIG. 1 the present method of automatic provisioning of a SIM card is illustrated. The automatic provisioning takes place when the SIM card 2 is used for the first time. When the SIM card 2 is used for the first time it is inserted into a mobile telephone 8. The automatic provisioning is carried out by means of an OTA (Over-The-Air) platform 1 and the mobile telephone 8.

According to the invention the SIM card is equipped with an automated provisioning application 3 that becomes resident on the card 2. Activation data 4 comprising IMSI and other data is being stored on the SIM card on specific memory area 9. Other data may comprise ICCID, OTA Keys and Card profileID.

The automated provisioning application and the activation data can be transferred to the SIM card 2 when it is manufactured.

According to a preferred embodiment of the present invention the activation data is encrypted by the SIM vendor with a Public Key. The Public Key can be provided by the provider of the system for present method.

When the SIM card is placed in the mobile telephone for the first time, and the telephone is switched on, the preloaded activation data is caused to be fetched from the PAD area by the automated provisioning application 3.

Thereafter the SIM card is caused to send a provisioning request to the OTA platform over the telephone network, such as a GSM network. This is accomplished by means of that the automated provisioning application sends activation data as a non encrypted Short Message (SM) over the telecommunication network. The SM is according to one embodiment sent to a transport server (TS) 5, which server is a part of the OTA platform.

Even if the activation data is encrypted, said request is not encrypted.

The TS 5 routes the activation data to a Card Activation Server (CAS) 6 also being a part of the OTA platform 1. The CAS decrypts the activation data with a DP (Delivery Platform) Private Key. The DP Private Key is provided by the provider of said Public Key.

A database 7 associated with the OTA platform 1 is thereafter caused to be updated with data including ICCID, IMSI and OTA keys. In the next step the OTA platform retrieves MSISDN from the data sent to the OTA platform, whereafter the MSISDN is attached to said IMSI.

Theses last steps are carried out by the CAS in four steps according to one embodiment of the invention.

In a first step the CAS updates the database 7 with ICCID, IMSI and OTA keys. In a second step the CAS retrieves the MSISDN, from the Short Message (SM) Originating address field and attaches the MSISDN to the IMSI. In a third step the CAS connects the IMSI to the Card Profile. In a fourth step an acknowledgement is sent to the SIM card, whereby the SIM card is ready for use.

Thus, the present invention solves the problem mentioned in the opening part of the present application and gives that the SIM card is made ready for use when it is used for the first time.

Above the present invention has been described in connection with different embodiments of the present invention. However, it is apparent that some of the steps can be carried out differently. The present invention shall not be restricted to the embodiments described above, but can be varied within the scope of the claims.

The invention claimed is:

1. A method of automatic provisioning of a SIM (Subscriber Identity Module) card when using the SIM card for the first time by means of an OTA (Over-The-Air) platform and a mobile telephone, the method comprising:
    equipping the SIM card with an automated provisioning application that becomes resident on the SIM card;
    storing activation data comprising IMSI (International Mobile Subscriber Identity) and other data on the SIM card;
    causing the SIM card to send a provisioning request, controlled by said application;
    when the SIM card is placed in a mobile telephone for the first time and the telephone is switched on, to the OTA platform, an ICCID (Integrated Circuit Card ID), the IMSI, and OTA keys being sent from the SIM card to the OTA in conjunction with the provisioning request;
    updating a database associated with the OTA platform with data that has been transferred from the SIM card to the OTA platform;
    wherein the OTA platform retrieves MSISDN (Mobile Station ISDN number) from the data sent to the OTA platform,
    wherein in the step of updating, the ICCID, IMSI, and OTA keys sent from the SIM card to the OTA platform are stored in said database,
    wherein the MSISDN is attached by the OTA platform to said IMSI sent from the SIM card to the OTA platform, and
    wherein, after the MSISDN is attached to said IMSI an acknowledgement is sent to the SIM card, whereby the SIM card is ready for use.

2. The method according to claim 1, wherein the activation data is encrypted by a SIM vendor with a Public Key.

3. The method according to claim 2, wherein the activation data is decrypted by the OTA platform using a Delivery Platform (DP) Private Key.

4. The method according to claim 1, wherein the activation data is encrypted by a SIM vendor with a Public Key.

5. A method of automatic provisioning of a Subscriber Identity Module (SIM) card when using the SIM card for the first time by means of an Over-The-Air (OTA) platform and a mobile device, the method comprising:
    equipping the SIM card with an automated provisioning application that becomes resident on the SIM card;
    storing activation data on the SIM card, the activation data comprising an IMSI (International Mobile Subscriber Identity) code;
    sending a provisioning request to the OTA platform, by the SIM card and controlled by the provisioning application, when the SIM card is placed in a mobile device for the first time and the mobile device is switched on, a Mobile Station ISDN number (MSISDN), an Integrated Circuit Card ID (ICCID), the IMSI code, and OTA keys being sent by the SIM card to the OTA platform in conjunction with the provisioning request;
    upon receipt of the provisioning request from the SIM card, storing in a database, by the OTA platform, the ICCID, the IMSI code, and the OTA keys received from the SIM card;
    attaching, by the OTA platform, the MSISDN received from the SIM card to the IMSI received from the SIM card; and
    sending an acknowledgment to the SIM card, by the OTA platform, after the MSISDN is attached to the IMSI, whereby the SIM card is ready for use.

6. The method according to claim 5, wherein the activation data is encrypted by a SIM vendor with a Public Key.

7. The method according to claim 6, wherein the activation data is decrypted by the OTA platform using a Delivery Platform (DP) Private Key.

8. The method according to claim 5, wherein the activation data is encrypted by a SIM vendor with a Public Key.

* * * * *